United States Patent
Hunter (10) Patent No.: US 6,308,518 B1
(45) Date of Patent: Oct. 30, 2001

(54) THERMAL BARRIER ENCLOSURE SYSTEM

(76) Inventor: Rick C. Hunter, 108 Imperial, Friendswood, TX (US) 77546

(*) Notice: Subject to any disclaimer, the term of this patent is extended or adjusted under 35 U.S.C. 154(b) by 0 days.

(21) Appl. No.: 09/676,224

(22) Filed: Sep. 28, 2000

Related U.S. Application Data (60) Provisional application No. 60/156,325, filed on Sep. 28, 1999.

(51) Int. Cl.⁷ ..................................................... F25B 21/02
(52) U.S. Cl. .................................. 62/3.3; 62/3.6; 62/371; 62/457.1
(58) Field of Search .............................. 62/3.3, 3.6, 3.62, 62/371, 430, 457.2, 530, 129, 457.1, 457.7; 165/48.1

(56) References Cited

U.S. PATENT DOCUMENTS

| | | | |
|---|---|---|---|
| 2,942,051 | 6/1960 | Roeder, Jr. | 136/4 |
| 3,112,878 | 12/1963 | Snelling | 236/1 |
| 3,463,224 | 8/1969 | Myers | 165/32 |
| 3,782,122 | 1/1974 | Lorenz | 60/531 |
| 3,957,107 | 5/1976 | Altoz et al. | 165/32 |
| 4,212,346 | 7/1980 | Boyd | 165/32 |
| 4,225,841 | 9/1980 | Saur et al. | 337/393 |
| 4,281,307 | 7/1981 | Hara | 337/114 |
| 4,281,708 | 8/1981 | Wing et al. | 165/32 |
| 4,364,234 | * 12/1982 | Reed | 62/3.3 |
| 4,388,965 | 6/1983 | Cunningham et al. | 165/32 |
| 4,402,358 | 9/1983 | Wolf | 165/32 |
| 4,457,327 | 7/1984 | Pepper | 137/67 |
| 4,498,312 | 2/1985 | Schlosser | 62/457 |
| 5,020,325 | 6/1991 | Henault | 60/528 |
| 5,040,368 | 8/1991 | Baker | 60/657 |
| 5,082,335 | 1/1992 | Cur et al. | 312/401 |
| 5,156,087 | 10/1992 | Cusson et al. | 100/93 |
| 5,319,937 | * 6/1994 | Fritsch et al. | 62/3.62 |
| 5,522,216 | 6/1996 | Park et al. | 62/3.6 |
| 5,535,815 | 7/1996 | Hyman | 165/32 |
| 5,572,873 | 11/1996 | Lavigne et al. | 62/3.6 |
| 5,899,088 | 5/1999 | Purdum | 62/371 |
| 5,950,450 | 9/1999 | Meyer et al. | 62/457.9 |
| 6,026,647 | * 2/2000 | Coffee et al. | 62/3.62 |
| 6,209,343 | * 4/2001 | Owen | 62/457.2 |

FOREIGN PATENT DOCUMENTS

| | | |
|---|---|---|
| WO99/27312A1 | 6/1999 | (WO) . |

* cited by examiner

*Primary Examiner*—Henry Bennett
*Assistant Examiner*—Melvin Jones
(74) *Attorney, Agent, or Firm*—Bracewell & Patterson LLP (57) ABSTRACT

A thermal barrier enclosure system, comprising one or more thermal barriers, providing active temperature control without an active heat pump, and enabling rapid recharge and thermal isolation of the onboard thermal storage material or payload. The thermal barrier enclosure system is used to control the temperature in a shipping container or a refrigerator. Thermal control is achieved with one or more thermal control barriers comprised of an insulation barrier, a temperature sensitive device, and a thermal conduit through which energy flows. The combination of the temperature sensitive device and thermal conduit forms a thermal regulator that varies the thermal energy flow as the regulator is operated from its open to its closed position, and vise versa. By positioning one or more thermal control barriers in a thermal enclosure, tight-tolerance temperature control can be achieved even when the external temperature may vary above or below the control volume temperature. A thermal control barrier with a reverse acting thermal regulator can also be used to cool an energy storage material and then to thermally insulate that material when the cooling source is removed. The combination of thermal control barriers provides temperature control, quick refrigerant recharge, and thermal isolation, enabling an enclosure to maintain internal temperatures for long periods of time.

20 Claims, 8 Drawing Sheets

THERMAL BARRIER ENCLOSURE SYSTEM

This application claims the benefit of Provisional Application No. 60/156,325 filed Sep. 28, 1999.

FIELD OF THE INVENTION

This invention pertains to stationary and mobile thermal enclosures where tight-tolerance temperature control is required and energy consumption is to be conserved. This invention further pertains to thermal control systems that can be recharged by intermittent power sources in remote areas away from continuous power systems.

BACKGROUND OF THE INVENTION

Numerous inventions address active and passive refrigerated or heated thermal enclosures. Active heat pumps, based on refrigeration systems such as vapor compression, adsorption, or thermoelectric devices provide tight-tolerance temperature control when used in conjunction with a closed-loop control system. These systems, however, require a large amount of electrical power and hence do not serve well for long duration shipping containers that may require from two to five days of temperature control under severe ambient environments. Passive systems using ice packs or dry ice may provide sufficient refrigeration for two to five days of shipping, but do not provide active temperature control. Active temperature control is very important when transporting temperature sensitive products such as vaccines or other pharmaceutical products.

One major problem with current shipping container enclosures is that the refrigerants, which might be designed to keep a product in a temperature range of two to eight degrees Celsius ("C."), may freeze the products. Even if the refrigerant has its phase change at zero degrees C., such as with water, the ice packs are typically frozen in a much colder environment to reduce the time it takes to freeze them. Consequently, when the packs are removed from a common industrial freezer that typically operates at −15 to −25° C., they may be as cold as the operating temperature maintained by the freezer. Depending on the insulative value of the enclosure and the amount of ice packs added, it could take many hours before the refrigerant ice packs warm up to the phase change temperature. During this time it is common for the temperature inside the enclosure to drop below freezing, thereby destroying the efficacy of the products. Damaged pharmaceutical products can be hazardous in two ways: (1) they can lose their efficacy and not perform their intended function; or (2) they can themselves become toxic.

A second common problem is that passive shipping containers with refrigerant packs are often inadequate to withstand high external temperatures. In any given packaging configuration of a passive enclosure with refrigerants, there is a fixed amount of thermal resistance between the payload (e.g. drug product) and the refrigerants. In high heat load environments, this fixed thermal resistance is often too high for the refrigerant to keep the contents of the entire enclosure below the maximum temperature to which the products are validated (typically 8° C. for a drug product). Consequently the fixed resistance nature of the "ice-packs in a foam box" approach is inadequate to keep the products below their maximum temperature control point. Similarly, a common problem is that passive shipping containers with refrigerant packs are often inadequate to keep the products from freezing when the enclosure is in a cold environment. In this situation, the fixed thermal resistance between the payload and refrigerants is too low, and consequently the refrigerant continues to cool the product even though the outside temperature is very low. Hence the inability for a passive shipping container with refrigerant packs to vary the thermal resistance between the refrigerant and payload is a major drawback.

Actively controlled thermal enclosures can sometimes overcome the shortcomings associated with the fixed-thermal-resistance-packaging approach described above. However, these systems have their own unique set of problems. In a shipping container application, the large amount of energy required to operate an actively powered heat pump is problematic. Even with the use of high R-value vacuum insulation panels, a large battery is required to maintain a tight-temperature tolerance over several days. Also, actively powered refrigeration systems require that the heat removed from the enclosure be rejected to the external environment. This is a problem if shipping containers are shrink-wrapped for shipment or if numerous containers are placed in a closed volume such as the back of a panel truck. If proper heat rejection is not achieved, the system will loose its ability to regulate the temperature inside the enclosure, resulting in product damage.

Another problem associated with actively powered thermal enclosures is that a heat pump is limited by the temperature difference it can maintain. As the ambient temperature increases, the temperature difference across the heat pump increases accordingly. At the same time, more thermal energy, or heat leak, enters the enclosure. That heat must be removed and rejected by the heat pump. That increases the temperature of the heat rejection device and further increases the temperature difference across the heat pump. Furthermore, if the heat rejection environment is affected by the increase in energy discharged into it, it will rise in temperature, further increasing the temperature difference across the heat pump. Not only can this scenario consume large amounts of battery power, it will ultimately lead to the system's inability to maintain the enclosure's internal temperature below its set point.

In a more stationary thermal enclosure application, such as with home refrigeration, in which electrical power is more readily available and the external temperature does not vary greatly, internal temperatures are more easily maintained. However, in this application, power consumption is high and refrigerators and freezers are reported to be the highest energy consuming appliances in a home. The power consumption is affected by the insulative value of the enclosure, the temperature difference between the outside and inside of the enclosure, the efficiency of the heat pump system, and, in some cases, the reverse heat leak through the heat pump when it is not actively being used, as is the case with a thermoelectric heat pump. A means to thermally disconnect the heat pump from the system when not in use would greatly reduce the heat leak into the system and reduce power consumption. Energy consumption would be further reduced if a thermal energy storage system were used, so that the heat pump might only operate for the time required to freeze a phase change refrigerant, such as water. This would allow the heat pump to be operated when energy cost were lower, such as during night hours. Energy would also be saved by operating the system at night because the heat rejected from a refrigerator in a home must be rejected by the home's air conditioning system, which will run more efficiently at night when external temperatures are typically cooler. In applications such as vending machines, in which power is often available, it would be even more important to be able to operate the heat pump only during evening hours when external temperatures are much lower and the heat pumps run more efficiently, consuming less power. For vending machines in remote areas, or for refrigerators in areas where no power is available, the thermal storage system would be very valuable because the system could be recharged from intermittent energy sources such as solar panels, gas powered generators, or even generators driven by campfires.

SUMMARY OF THE INVENTION

It is an objective of the present invention of a thermal barrier enclosure system to provide active temperature control without an active heat pump. Exploiting the positive attributes of passive heat sinks or sources and active temperature control, the shortcomings of the current state-of-the-art are addressed. The present invention uses one or more thermal control barriers that may serve multiple purposes. A thermal control barrier comprises a temperature sensitive thermal device, such as a thermal actuator, coupled to highly conductive elements that accommodate displacement without compromising conductive properties, and an insulation barrier separating one thermal environment from another. The primary functions enabled by the proper combination of these thermal management components include an actively controlled thermal enclosure, a rechargeable container for the heat sink or source, and a thermal disconnect for active heat pump systems.

It is a further objective of the present invention to manage the thermal barrier enclosure system's payload control volume by using two or more proximate chambers. The refrigerant, or heat source, is located in a compartment that is thermally separated from the payload control volume by a thermal control barrier. A thermal regulator, comprising a thermal actuating device and high thermal conductors, regulates the flow of energy across an insulative barrier. When the temperature sensitive thermal device reacts to its temperature surroundings, the regulator either open, closes, or varies the thermal resistance across the barrier. By regulating, the thermal energy flow from the payload control volume to the refrigerant (or vise versa for a heat source), temperature control is maintained.

It is a further objective of the present invention to be used to recharge a refrigerant or heat source pack. If such a pack is well insulated, recharge is typically difficult and slow unless the insulation is first removed. The present invention permits the passage of heat through the thermal barrier to extract heat from the heat sink or add heat to the heat source inside the insulated pack. A shipping container that has a removable lid that can be recharged by placement in a freezer environment is one embodiment of the present invention.

Another objective of the present invention is to thermally disconnect heat conducting components. One example is a refrigerator using a thermoelectric heat pump. Due to the materials of construction, a thermoelectric device can conduct a large amount of heat into or out of an insulated enclosure. The present invention provides a thermal disconnect by using temperature sensitive devices such as thermal actuators, and efficient thermal transport conduits, which increase or decrease the thermal resistance across a thermal interface. By automatically disconnecting the heat pump from the system, less energy enters the enclosure. Thus, power cost are reduced and cycle periods are increased.

Other objects and features of the present invention will become apparent from consideration of the following descriptions taken in conjunction with the accompanying drawings.

CROSS REFERENCE TO RELATED APPLICATIONS

Thermally regulated enclosures of various types and for various purposes are found in the prior art. These are broadly categorized as active systems or passive systems. Active systems generally use electrical power to energize a heat pump controlled by an electrical controller based on input from a temperature sensor. Passive systems use a refrigerant, such as water, in a foam insulated box. The present invention combines elements of these two together, by using one or more thermal control barriers, to provide active temperature control without active heat pumps.

Thermal Switches and Conduits

The references cited under this heading pertain to thermal switches and conduits. They do not, however, teach a thermal enclosure that uses an insulation barrier incorporating a thermal regulator, separating the control volume from a thermally isolated thermal storage material.

Hyman, et al., U.S. Pat. No. 5,535,815, describes a "package-interface switch" used to control the temperature of spacecraft components. This switch, made from shaped memory alloy, is used in the low pressure environment of space to control the temperature of electronic equipment.

Cunningham, et al., U.S. Pat. No. 4,388,965, describes a thermal switch made using phase change materials coupled to flexible thermal conductors.

Henault, U.S. Pat. No. 5,020,325, describes a heat motor, or thermal actuator, that uses a phase change wax material in a piston arrangement with an embedded heating element for external heating and actuation of the actuator.

Lorenze, U.S. Pat. No. 3,782,122, describes a heat motor, or thermal actuator, that uses a phase change material in a bellows arrangement with associated heating element.

Myers, U.S. Pat. No. 3,463,224, describes a thermal heat switch that uses an expandable liquid inside with a bellows arrangement.

Boyd, U.S. Pat. No. 4,212,346 describes a variable heat transfer device using an expandable fluid in a piston arrangement.

Other prior art thermal switches use bi-metallic composites that exhibit structural stiffness changes due to differences in thermal expansion of two or more materials. Such actuators can be controlled by active heating or cooling elements.

Active Refrigerators

The references cited under this heading pertain to active refrigeration systems designed to maintain a specific temperature inside an enclosure. They do not, however, teach a thermal enclosure that uses an insulation barrier incorporating a thermal regulator, separating the control volume from a thermally isolated thermal storage material. Nor do these patents teach the recharge of a thermal storage material with the use of an active heat pump.

Lavigne, et al., U.S. Pat. No. 5,572,873, describes an electrically controlled thermal enclosure using a thermal electric cooler and a closed loop control system. Temperature control of the payload area, or the area where temperature sensitive products are placed for shipping or storage, is achieved with the placement of a temperature sensor inside the payload area, which is used to provide electrical feedback to the controller, which in turn turns on or off an electric heat pump.

Wheeler, World Intellectual Property Organization patent WO9927312A1, describes a container using a thermoelectric cooling unit and fan arrangement to control the payload volume temperature.

Park, et al., U.S. Pat. No. 5,522,216, describes a thermoelectric refrigerator that uses an active controller, sensors, and a fan to maintain payload temperatures. This patent also describes the use a phase change material in the system. In this patent, the phase change material is used to level out high heat load events, such as the entry of a warn product into the refrigerated area. The phase change material is in the airflow stream and not thermally isolated from the payload environment.

Meyer, et al., U.S. Pat. No. 5,950,450, describes a thermal enclosure which can be operated by using either an add-on, battery powered vapor compression heat pump, or phase change materials to maintain proper payload temperatures.

Insulated Thermal Enclosures

The references cited under this heading pertain to insulated thermal enclosures. Some teach the use of phase change materials. However, none teaches a thermal enclosure that uses an insulation barrier incorporating a thermal regulator, separating the control volume from a thermally isolated thermal storage material.

Cur, et al., U.S. Pat. No. 5,082,335, describes a thermally insulated enclosure using highly resistive vacuum insulated panels.

Schlosser, U.S. Pat. No. 4,498,312, describes an insulated enclosure with multiple chambers, and the use of phase change materials within these separate chambers.

Purdam, U.S. Pat. No. 5,899,088, describes a system and method for controlling a payload temperature by using phase change materials selected to envelop the two ends of desired temperature control range.

DETAILED DESCRIPTION

Figure 1:
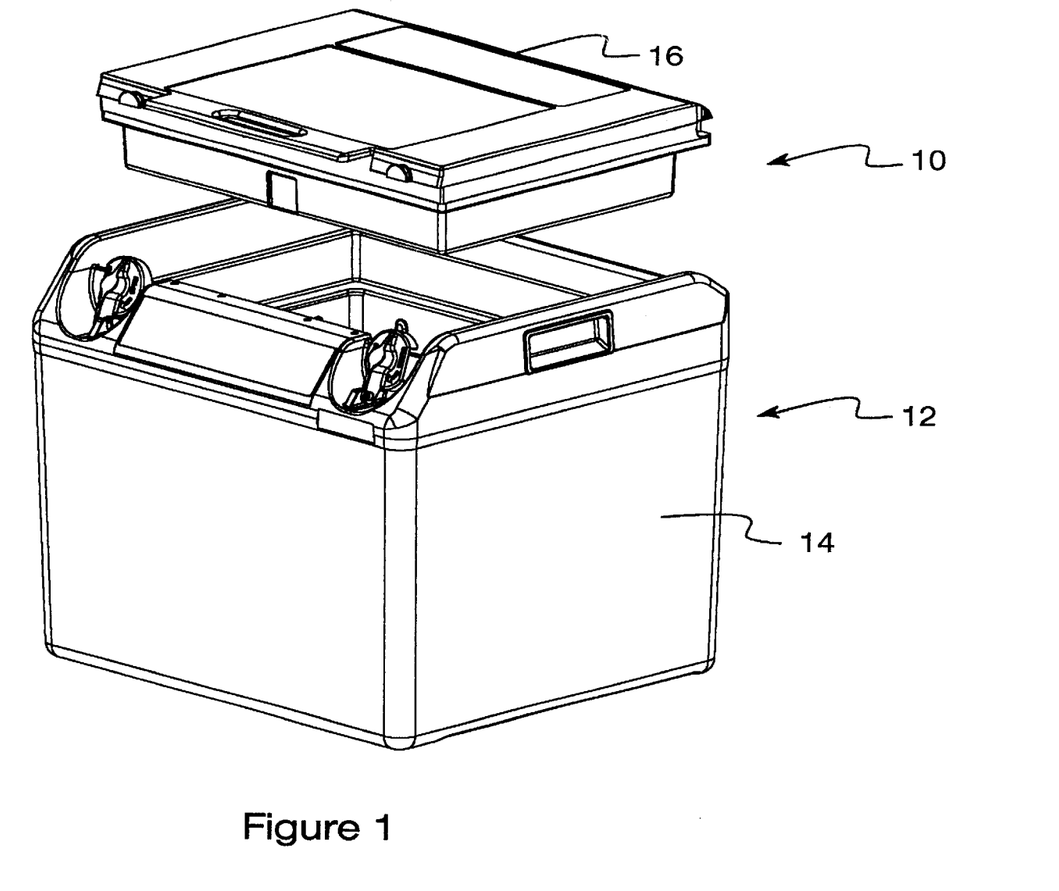
FIG. 1 is an isometric view of a thermal barrier enclosure system constructed in accordance with this invention.

FIG. 1 shows one embodiment of a thermal barrier enclosure system 10 constructed in accordance with this invention. This embodiment comprises an insulated box 12 with walls 14 and a lid 16. This is a more sophisticated embodiment than other possible embodiments. To more clearly illustrate the basic concepts of the invention, those less sophisticated embodiments will be discuss initially herein. The embodiment of FIG. 1 will then be discussed in detail.

Figure 2:
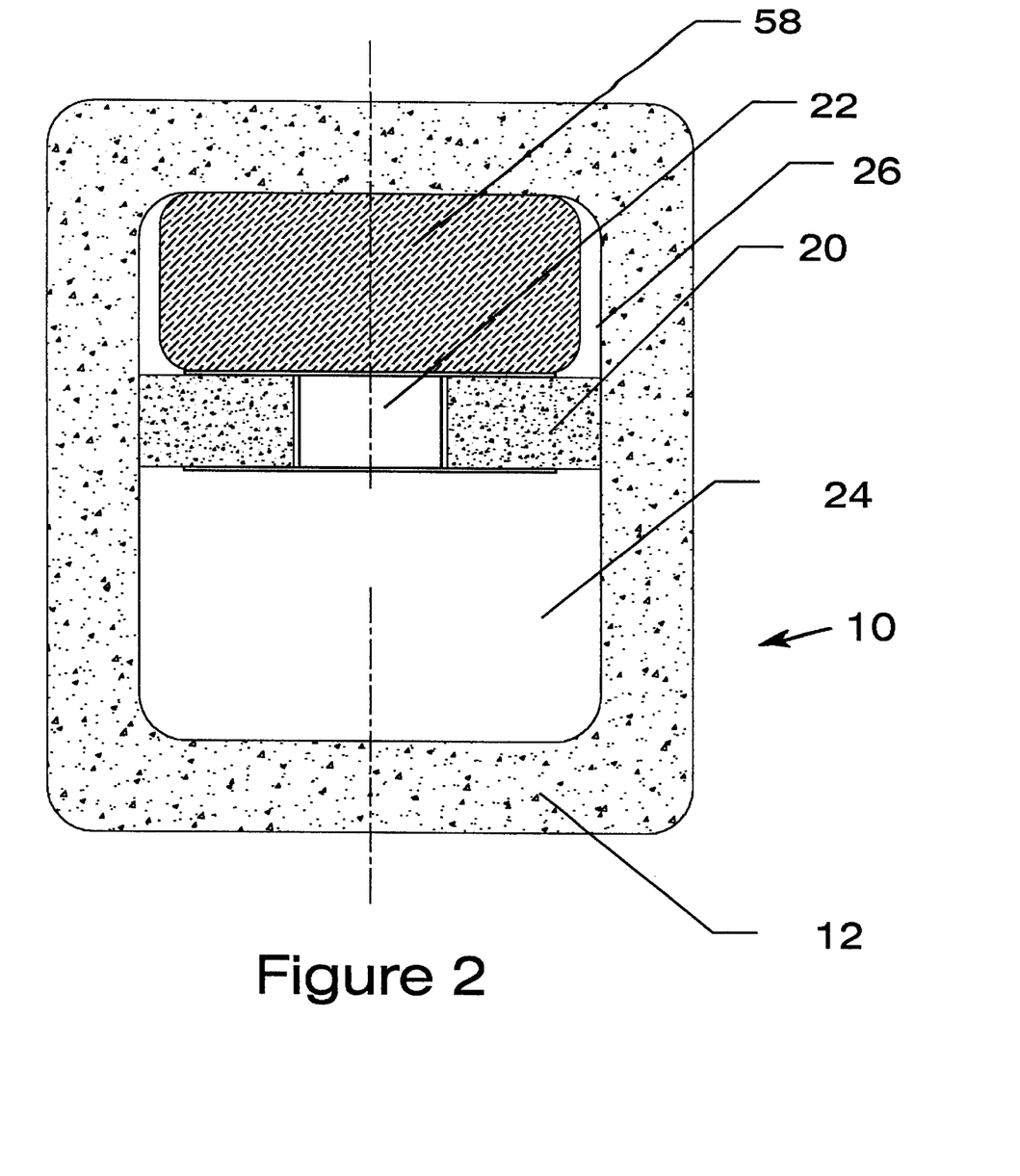
FIG. 2 is a cross sectional view of a thermal barrier enclosure system constructed in accordance with this invention showing a two compartment thermal enclosure with a thermal control barrier and a heat sink or source energy storage material.

FIG. 2 shows a cross sectional view of a two-compartment thermal barrier enclosure system 10 in which a payload control volume 24 is separated from a source volume 26 by a insulative barrier wall 20. An energy storage device 58 is thermally isolated from the payload control volume 24 by the insulative wall 20 and thermal regulator 22. In this arrangement, the thermal regulator 22 is thermally responsive to the temperature in the payload control volume 24. The thermal regulator 22 automatically adjusts the thermal resistance between the payload control volume 24 and the source volume 26.

Figure 3:
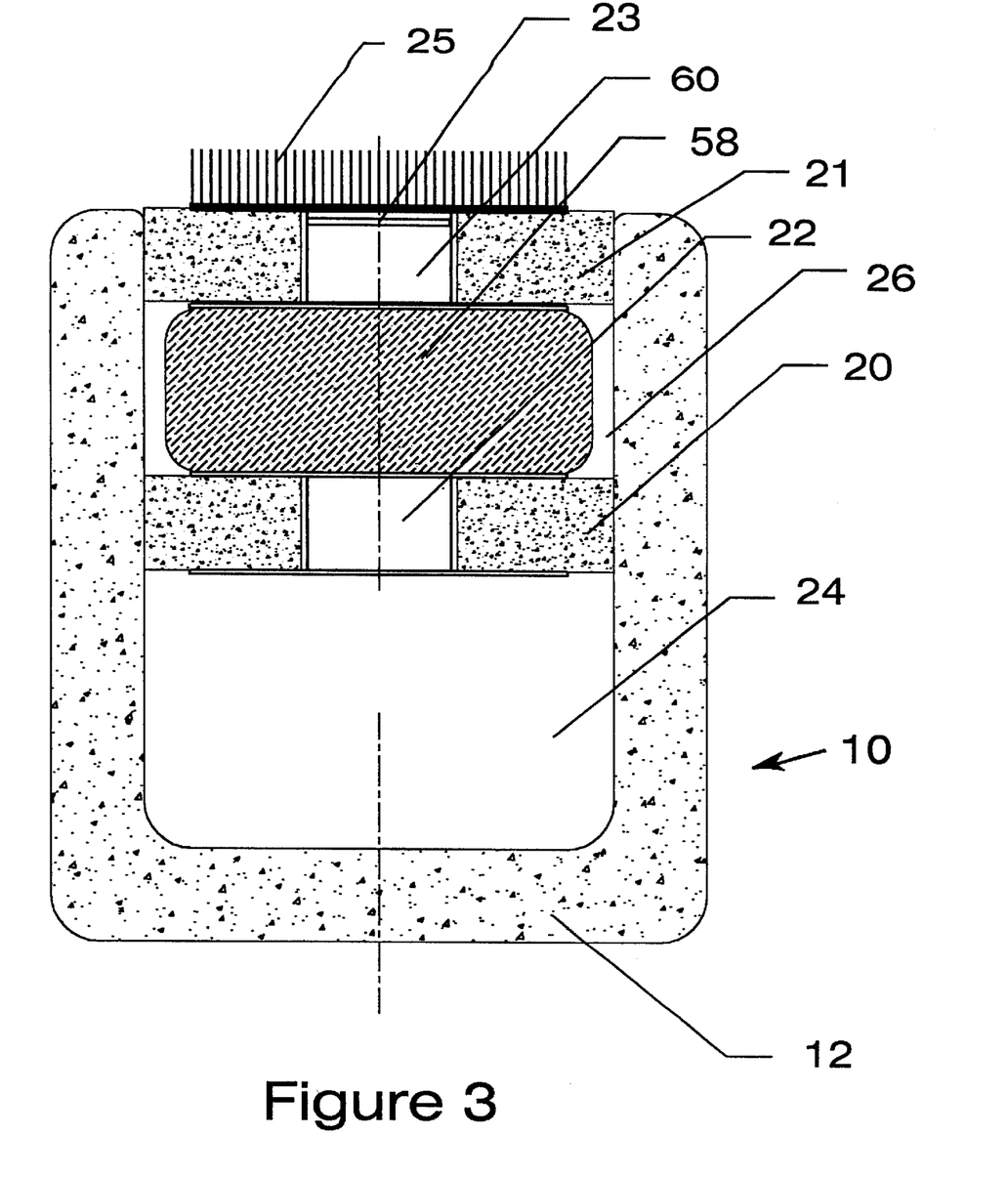
FIG. 3 is a cross sectional view of the thermal barrier enclosure system of FIG. 2 with a second thermal control barrier separating the heat sink or source energy storage material from an active heat pump.

FIG. 3 shows the thermal barrier enclosure system 10 of FIG. 2, but with an active heat pump 23. Source volume 26 is separated from heat pump 23 (or some other recharge source) by thermal control barrier 21 and thermal regulator 60. The energy storage device 58 can be recharged by heat pump 23, which is located between the thermal regulator 60 and heat exchanger 25. In this arrangement, the thermally sensitive device 60 is predominantly thermally coupled to the cold side of the heat pump (when cooling is the objective of the enclosure) and thermally isolated from the source volume 26. The thermal regulator 60 senses or responds to the heat pump temperature and automatically adjusts the thermal resistance between the energy storage device 58 and heat pump 23. When the heat pump 23 begins to cool down the energy storage device 58, the thermal regulator is in a high thermal resistance mode. Once the actuation temperature is reached, the thermal resistance drops significantly, allowing thermal energy from the energy storage device 58 to be removed until it is fully recharged. Once the heat pump is turned off and the energy storage device 58 temperature rises, the thermal regulator 60 actuates such that the thermal resistance is again very high, thereby thermally isolating the energy storage device 58 from warm, ambient temperatures and thereby maximizing the duration over which the system can maintain temperature control.

In certain circumstances, such as when a thermal barrier enclosure system 10 will be exposed to long periods of cold temperatures, it is beneficial to add heat to the payload control volume 24 via an electrical resistance heater or other heat source, in combination with a thermal control barrier to prevent unwanted cooling of the enclosure's payload from the energy control device 58. A temperature sensitive device such as a thermal actuator coupled to an electrical switch could be used to turn on battery power to a resistance heater mounted on or near the payload liner. Similarly, power control could be obtained with the use of a microprocessor and temperature sensor.

Figure 4:
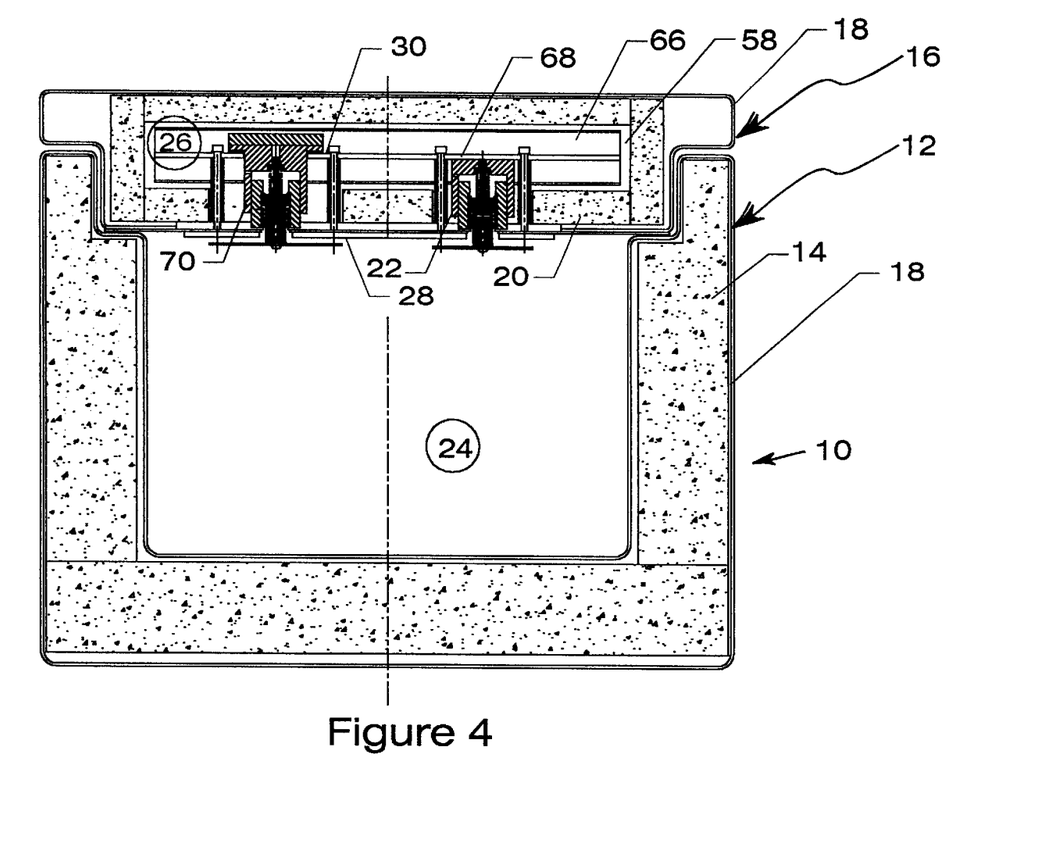
FIG. 4 is a cross sectional view of the thermal barrier enclosure system of FIG. 1.

Now referring to FIG. 4, a thermally controlled enclosure 10 constructed in accordance with this invention is an insulated box 12 with walls 14 and a lid 16. Walls 14 are constructed of a highly insulative material, Such as vacuum thermal insulating panels having a foam core vacuum packed in a gas impermeable skin. Walls 14 are arranged in the shape of a box and preferably have a tough, protective shell 18 surrounding the insulation. Shell 18 is a rigid plastic, such as polypropylene or polyethylene, formed to surround walls 14 and protect the fragile insulation against abrasion, impacts and puncture. Lid 16 is also constructed of a highly insulative material, such as vacuum thermal insulating panels, and has a protective shell 18 as above. Lid 16 is hingedly joined to box 12 to allow objects to be placed inside box 12 and is also adapted to be easily removed from box 12. Lid 16 seals in walls 14 creating a substantially air tight seal. Latches are included to latch lid 16 closed.

Lid 16 has an insulative barrier wall 20 with a thermal regulator 22 mounted therein. Insulative wall 20 separates a payload control volume 24 formed by box 12 from a source volume 26 contained in lid 16. Wall 20 has a thermally conductive first surface 28 in control volume 24 and an opposed thermally conductive second surface 30 in source volume 26. Thermal regulator 22 is a thermally responsive thermal resistor within wall 20 that closes or breaks a thermal conduit through which thermal energy can flow from one side of insulative wall 20 to the other to regulate the temperature in control volume 24.

Figure 5:
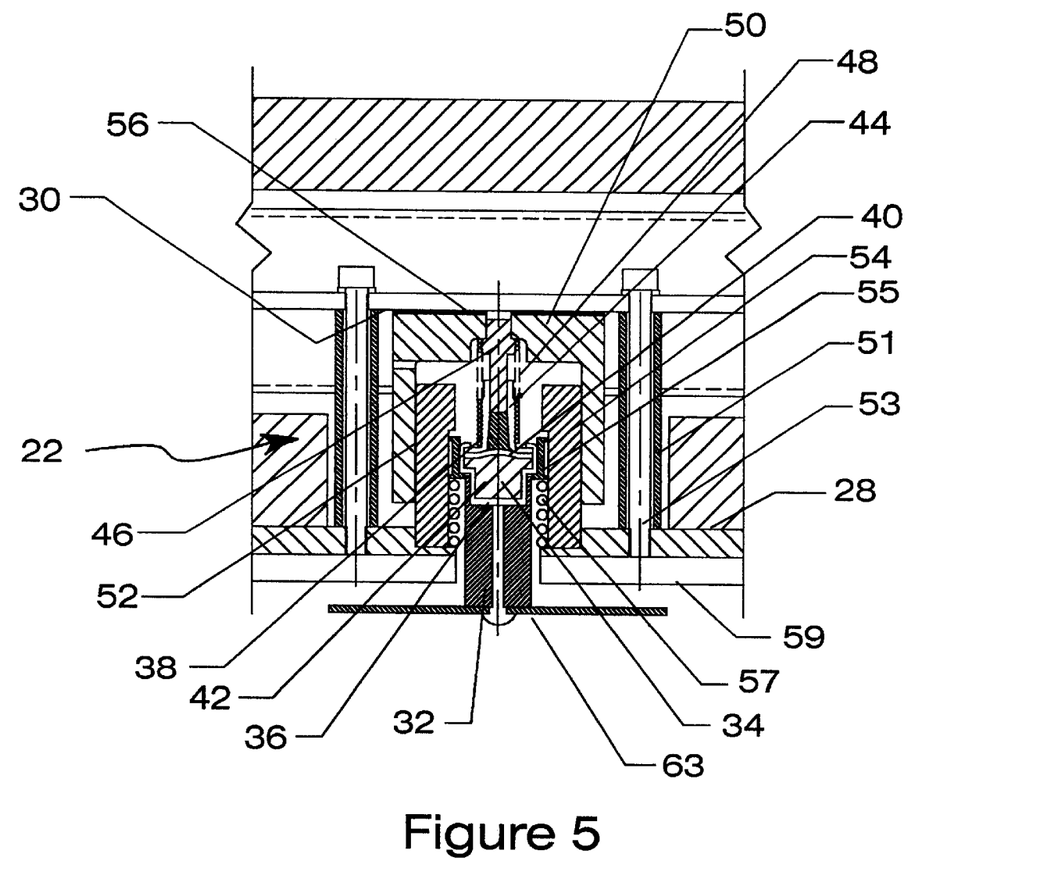
FIG. 5 is a cross sectional view of a thermal control regulator based on a diaphragm-type thermal actuator and concentric thermal conductors that may be used in an embodiment of this invention.
Figure 6:
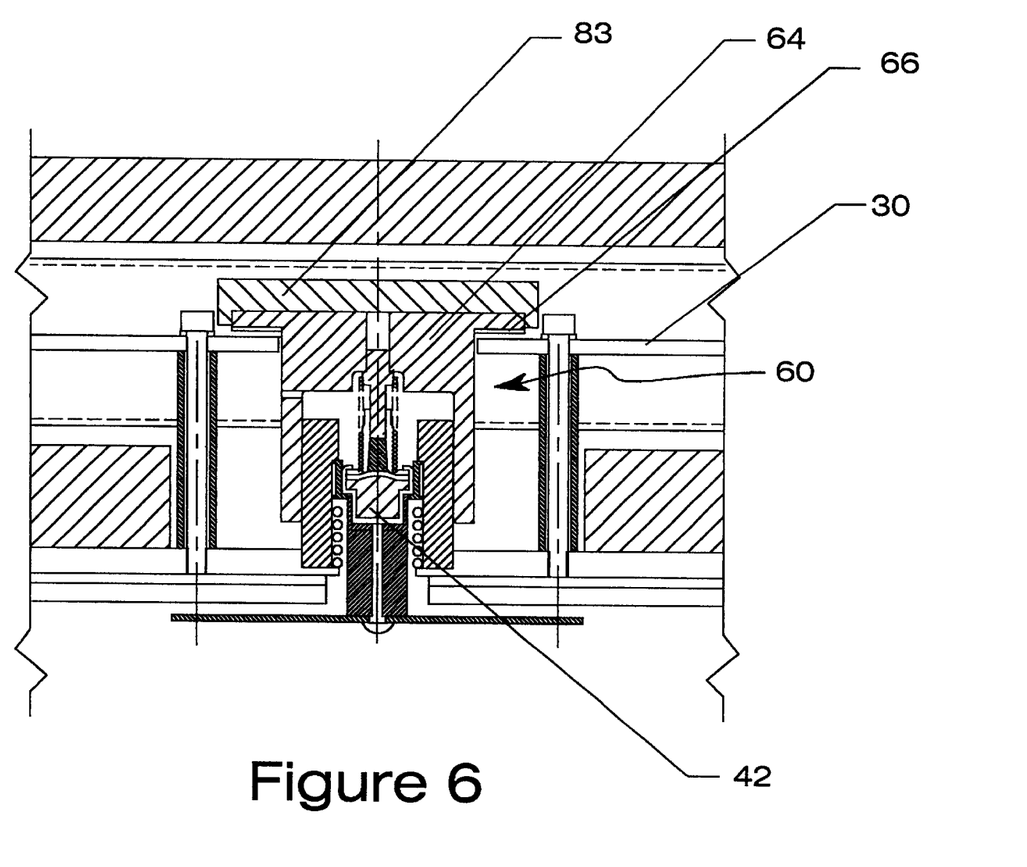
FIG. 6 is a cross sectional view of a reverse-acting thermal control regulator based on a diaphragm-type thermal actuator and concentric thermal conductors that may be used in an embodiment of this invention.

The thermal regulator 22 depicted in FIG. 5 is configured to cool and maintain control volume 24 at a temperature higher than or equal to the temperature of source volume 26, but lower than the ambient temperature. Thermal regulator 22 can also be configured as in FIG. 6 to maintain control volume 24 at a temperature lower than or equal to the temperature of source volume 26, but higher than the ambient temperature. FIG. 6 is discussed in more detail below. Thermal regulator 22 in FIG. 5 is an actuator 32 with central chamber 34 therein. Chamber 34 has a lower portion 36 separated from an upper portion 38 of smaller volume by an elastomeric diaphragm 40. Lower portion 36 contains a phase change material (PCM) 42, such as a paraffin including n-tetradecane or n-dodecane, chosen for the temperature at which it transitions from a solid to a liquid. Diaphragm 40 seals PCM 42 into chamber 34. Actuator 32 has a receptacle 44 intersecting upper portion 38 of chamber 34. Receptacle 44 slidingly receives an actuating member 46 to insert into upper portion 38. When PCM 42 is frozen, it resides toward lower portion 36 and actuating member 46 can be received within receptacle 44 in a retracted position. A spring 48 is concentrically positioned around actuator 32 and is joined to actuating member 46 and actuator 32. Spring 48 biases actuating member 46 into receptacle 44, so that actuating member 46 remains seated in receptacle 44 when PCM 42 is frozen. When the temperature surrounding actuator 32 rises above the freezing point of PCM 42, PCM 42 melts or liquefies and expands into upper portion 36, stretching elastomeric diaphragm 40 and forcing actuating member 46 upward.

Actuating member 46 engages an upper conduit member 50, preferably with an interference fit. Thus, upper conduit member 50 moves with actuating member 46 as PCM 42 expands and contracts. Upper conduit member 50 has a central bore 52 which slidingly receives a lower conduit member 54. Central bore 52 can be filled with a high thermal conductivity filler such as thermal grease to minimize the thermal resistance between the conduit members. Lower conduit member 54 concentrically engages actuator 32 and extends upward. Lower conduit member 54 acts to guide upper conduit member 50 in axial movement while restraining any lateral movement of upper conduit member 50 in relation to actuator 32. Also, lower conduit member 54 resides in contact with thermally conductive first surface 28 of control volume 24.

Thermal regulator 22 is positioned between second surface 30 and first surface 28 by plastic compression posts 51 and held together by tension bolts 53. Insulative spacers define the spacing between surfaces 28 and 30 and minimize heat transfer from surface 28 to surface 30 when the thermal actuator 32 is open. Regulator girth ring 55 is a thermal insulator providing a controlled stop against lower conduit member 54 and a reaction surface for compression spring 57. Compression spring 57 applies a constant force between upper conduit member 50 and second surface 30, and prevents the overstressing of tension bolts 53 when actuator member 46 is fully extended. Insulation pad 59 minimizes heat transfer from convection plate 61 to temperature control plate 63. Temperature control plate 63 provides sufficient heat transfer area to maintain PCM 42 near the control volume 24 temperature so that thermal actuator 32 is sensitive to changing internal temperatures. Actuator 32 is in intimate thermal contact with temperature control plate 63, and thermally isolated from conduction path members. As the temperature in control volume 24 rises above the freezing temperature of PCM 42, PCM 42 thaws and expands, forcing actuating member 46, and thus upper conduit member 50, upward into contact with second surface 30 to close thermal regulator 22. In the closed position, thermal regulator 22 creates a conductive heat path for heat to travel from control volume 24 into source volume 26 to cool control volume 24. When control volume 24 cools to the freezing temperature of PCM 42, PCM 42 freezes and upper conduit member 50 draws out of contact with second surface 30, opening regulator 22 by breaking the conductive heat path and greatly reducing the amount of heat transfer between control volume 24 and source volume 26.

Upper conduit member 50 is positioned to reside adjacent to, but out of contact with thermally conductive second surface 30 in source volume 26 when actuating member 46 is fully received in receptacle 44 and PCM 42 is frozen. Upper conduit member 50 moves into contact with surface 30 as PCM 42 begins to thaw and expands. When in contact with thermally conductive second surface 30, upper conduit member 50 bridges a heat path from second surface 30, through upper conduit member 50, through lower conduit member 54, to first surface 28. Thus, the regulator is closed and the temperature in source volume 26 and control volume 24 tends to equalize. To ensure efficient conductive heat transfer between upper conduit member 50 and surface 30, upper conduit member 50 has a highly, thermally conductive pad 56 on the surface of upper conduit member 50 that contacts second surface 30.

FIG. 6 depicts a reverse thermal regulator 60 configured to maintain control volume 24 at a temperature lower than or equal to the temperature of source volume 26, but higher than the ambient temperature. Thermal regulator 60 is similar to thermal regulator 22 except that it has a PCM 42 with a different freezing point and an external contact member 64. It also has insulation barrier 83. External contact member 64 extends through second surface 30, such that when PCM 42 is liquid, contact member 64 resides out of contact with second surface 30, and when PCM 42 freezes, contact member 64 lowers into contact with second surface 30. Contact member 64 also has a thermally conductive pad 66 where contact member 64 contacts second surface 30 to ensure efficient heat transfer. Thus, when the temperature in control volume 24 drops below the freezing point of PCM 42, PCM 42 freezes and contact member 64 lowers into contact with second surface 30, closing regulator 60 and bridging a conductive heat path from source volume 26 to control volume 24. When enough heat has migrated from source volume 26 to control volume 24 to heat control volume 24 above the freezing temperature of PCM 42, PCM 42 melts, lifting contact member 64 out of contact with second surface 30 and opening regulator 60 to substantially decrease the heat transfer between control volume 24 and source volume 26.

Referring again to FIG. 4, lid 16 contains an energy storage device 58 within source volume 26. Energy storage device 58 is commonly known in the art and used for storing thermal energy to act as a heat source or heat sink. In an embodiment such as in FIG. 4, where the control volume 24 is to be maintained at or above the temperature of source volume 26, but below ambient temperature, source volume 26 in lid 16 is preferably filled with ice packs. The storage device 58 must be charged by heating or cooling source volume 26 to a desired temperature, depending on the application. In the case of ice packs, they must be cooled to freeze the water. To freeze the water, lid 16 can be removed from box 12 and placed in a cold environment such as a freezer. Because the ice packs or storage device 58 are insulated within lid 16, they do not cool efficiently when in the cold environment. Therefore, an additional cooling thermal regulator 70 is provided to provide a heat transfer path into lid 16 when the ambient temperature about lid 16 is below the freezing temperature of water packs 58. Cooling regulator 70 is configured similarly to thermal regulator 60 depicted in FIG. 6. If storage device 58 is an ice pack, it is preferable to choose PCM 42 in cooling regulator 70 to freeze at −3° C., safely below the freezing temperature of water. PCM 42 in thermal regulator 22 may be chosen to have a higher freezing point; a convenient value being 5° C., to maintain control volume 24 in the 2 to 8° C. range. Thus, when lid 16 is placed in a cold environment to freeze ice packs 58, PCM 42 in cooling regulator 70 freezes and contracts allowing contact member 64 to contact second surface 30 to close regulator 70 and bridge a heat path from the cold ambient into ice packs 58. However, when the ambient is above −3° Celsius, such as when lid 16 is removed from the cold environment, PCM 42 in cooling regulator 70 melts and cooling regulator 70 opens, substantially breaking the heat path from the ambient to ice packs 58. Alternatively, cold air can be forced through the lid to remove heat and recharge storage device 58.

It will be readily appreciated by one skilled in the art that container 10 configured to maintain control volume 24 at a temperature lower than source volume 26, but higher than ambient uses a thermal regulator 60 as in FIG. 6 to maintain the temperature and a regulator 22 as in FIG. 5 to charge the thermal storage device 58. PCM 42 in regulator 60 is chosen such that as the temperature of control volume 24 drops below a given temperature, PCM 42 will freeze and close regulator 60 to transfer heat into control volume 24. PCM 42 in regulator 22 is chosen so that, at a temperature above PCM 42, it will close regulator 22 when lid 16 is subjected to a warm environment to charge storage device 58.

The embodiment depicted in FIG. 4 has a storage device 58 of four plastic packs 66 containing ice and separated by thermally conductive plates 68. Thermally conductive plates 68 are tied into second surface 30 and cooling regulator 70 to create a conductive thermal path from ice packs 66 to surface 28. Thermally conductive plates 68 are also tied into second surface 30 and cooling regulator 22 to create a thermal path from ice packs 66 to surface 28. Plates 68 are preferably made from aluminum for high thermal conductivity and weight savings. An alternative could be a thermally conductive metallic extrusion, again preferably aluminum, having a plurality of smaller chambers to form a plurality of ice pockets. Another alternative could include a thermally conductive box joined to second surface 30 and preferably aluminum with thermally conductive mesh joined to surfaces of the box. The box would contain the ice and the mesh would ensure an efficient thermally conductive path from the ice to second surface 30.

Figure 7:
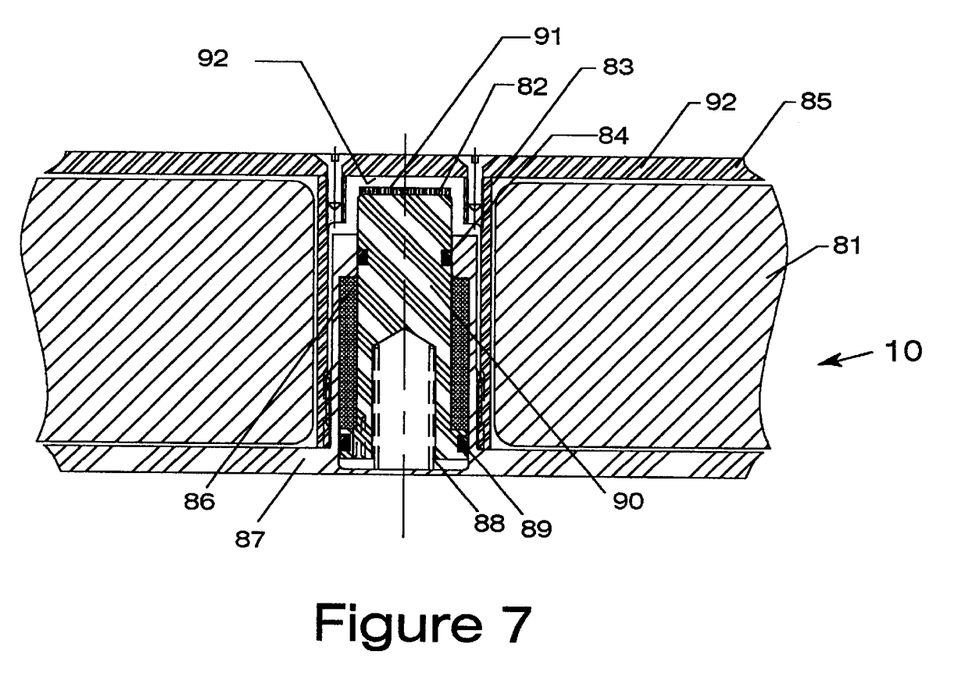
FIG. 7 is a cross sectional view of a reverse-acting thermal control regulator based on a piston-type thermal actuator that may be used in one embodiment of this invention.

FIG. 7 illustrates a thermal barrier enclosure system 10 using a piston-style reverse acting thermal control regulator. This regulator acts to close or minimize a heat transfer path, comprised of sensing plate 87, phase change material 86, shuttle piston 90, and heat transfer interface plate 85, regulating the flow of energy across insulation barrier 81. Phase change material 86 is composed of a class of hydrocarbon paraffins that have different melt and thaw temperatures depending on the hydrocarbon molecular chain length. The phase change material 86 is sealed between the shuttle piston 90 and sensing plate 87 with seals 84 and 89. When sensing plate 87 is warmer than the phase change temperature of the actuator material, the paraffin is in its liquid state, having a volume significantly greater than the volume when in the frozen or solid state. When in the liquid state, the actuator phase change material 86 displaces shuttle piston 90 toward the sensing plate 87 against the force of compression spring 88. In this position, the shuttle piston 90 is separated from heat transfer interface plate 85 leaving an air gap between surfaces 91 and surface 92. In this open position, heat transfer is minimized from one side to the other with predominant heat flow being across the air gap and along plastic spacer 83. When sensing plate 87 is cooled down below the phase change temperature of the actuator paraffin, phase change material 86 contracts as it is frozen. Shuttle piston 90, with assistance from spring 88, moves towards heat transfer interface plate 85 until interface pad surface 92 is in contact with heat transfer interface plate surface 91. Interface pad 82 is a thermally conductive compliant interface material comprised of filled elastomers, plastics, or cloth type materials. Fillers may include metallic particles, carbon graphite type materials, or other highly conductive materials. The purpose of the interface pad material is to increase the surface area contact between mating members by geometrically accommodating surface irregularities, resulting in a reduction in thermal resistance across the interface. Additionally, the compressible interface material acts as a variable thermal resistor exhibiting greater thermal resistance when only slightly compressed, and significantly less thermal resistance when fully compressed. This aspect of the interface material differentiates a thermal valve from a thermal regulator. Hence, when in the closed position, heat transfer is significantly increased as the thermally resistive air gap is partially or wholly eliminated. Heat may now pass more readily from the heat transfer interface plate 85 through the shuttle piston 90, through both the phase change material 86 and sensing plate 87.

Such a thermal control barrier is beneficial as a thermal regulator to violate the insulation barrier 6 for an intermittent time period during which heat is moved across the thermal control barrier. Examples include heat pump interfaces, insulated refrigerant pack interfaces, and interfaces to control volumes designed to be maintained at temperatures colder than the heat source yet warmer than the external environment temperature.

Figure 8:
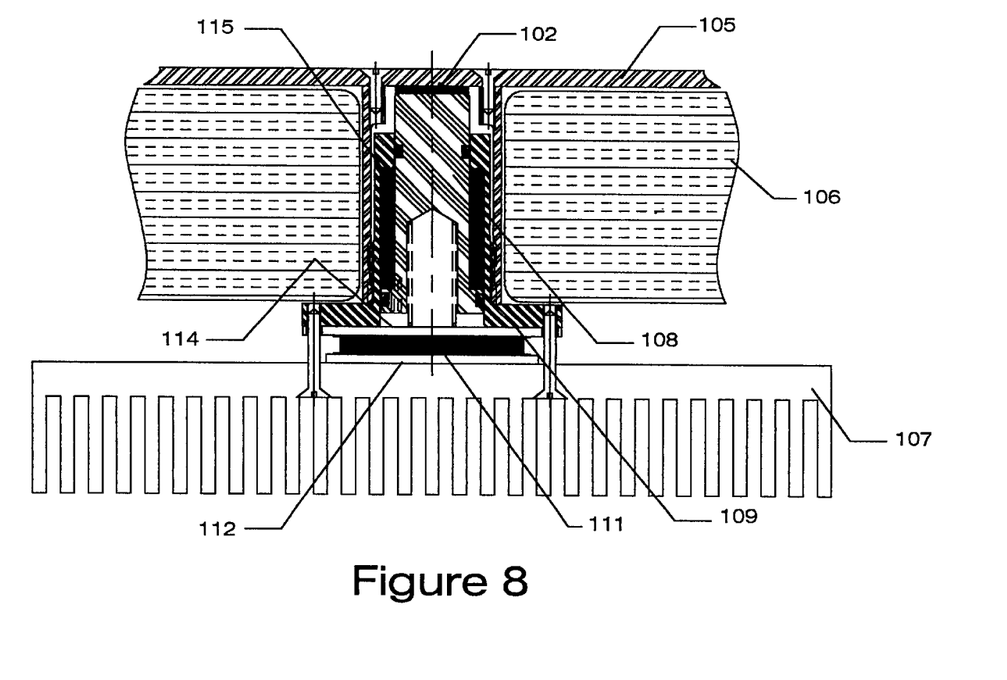
FIG. 8 is a cross sectional view of the reverse-acting thermal control regulator of FIG. 7 connected to a heat pump and heat exchanger.

FIG. 8 is a piston-style reverse acting thermal control regulator, such as described above, connected between a thermoelectric heat pump and a volume to be cooled. A thermoelectric heat pump is a series of thermopiles operating on the Peltier Effect. When a current passes through the heat pump, one side gets cold while the other side gets hot. Heat sink 107 of FIG. 8 is comprised of a finned type heat sink in combination with a fan, or other device, for moving air across the fins and thereby removing thermal energy into the surrounding environment. Alternatively, heat sinks using natural convection, liquid cooled heat sinks, and heat pipes could be employed as well. When powered, heat pump surface 112 begins to rise in temperature as heat pump surface 114 begins to cool. When the sensing plate 109 is cooled below the phase change temperature of the actuator paraffin, the shuttle piston 108 closes the air gap at interface 102 as previously described, thereby significantly increasing the flow of thermal energy across the insulation barrier 106. When the cool down, or recharge process is complete, the heat pump 111 is turned off resulting in an increase in the temperature at surface 114 and sensing plate 109, and ultimately the phase change material 115 in the actuator. When the temperature has risen above the phase change temperature of the phase change material, shuttle piston 108 is forced away from the heat transfer interface 102, thereby thermally isolating the cooled environment associated with heat transfer plate 105.

The following example describes an embodiment for a shipping container designed to keep the product between 2 and 8° C. for 3 to 5 days without external power.

EXAMPLE 1

A thermal enclosure, having and internal volume of 36 liters, is built using vacuum insulated panels two inches thick that has a thermal enclosure R-value of approximately 40 (hr-ft2-F/BTU). The vacuum insulated panels are comprised of an open celled foam material and evacuated to a pressure of 0.05 torr. The lid of the enclosure is removable. Inside the lid is ten pounds of water, that when frozen, provides the refrigeration needed for 5 days of temperature control with an external environment of 25° C. The lid refrigerant is surrounded by vacuum insulation panels that are one inch thick. The bottom panel of the lid is penetrated with a thermal regulator comprised of a thermal actuator and a series of aluminum conductors, in a concentric cylindrical fashion. The thermal actuator is based on a phase change hydrocarbon material that has a mean phase change temperature of 5° C. When the actuator is at a temperature above about 5° C., the thermal actuator is fully extended. When fully extended the conducting cylindrical components are in contact between two aluminum plates, one plate thermally connected to the refrigerant in the lid and the other plate thermally connected to the payload control volume. In this position, there is a low thermal resistance between the refrigerant in the lid and the payload control volume. Components are sized so that when the enclosure is subject to the maximum external temperature extreme of 55° C. for one hour, there is sufficient energy flow through the thermal regulator to keep the payload control volume under 8° C. When the thermal actuator drops below about 5° C., the thermal actuator contracts thereby separating the cylindrical thermal conductor from the aluminum plate coupled to the refrigerant, leaving an air gap. In this position, the thermal resistance from the refrigerant to the payload is many times greater than when the gap is closed, thereby minimizing heat transfer between the refrigerant and payload. This not only prevents sub-cooled refrigerant from freezing the payload by also greatly extends the time the enclosure can remain in external temperatures below freezing without damaging the products inside.

Two examples of the use of a thermal control barrier in which the thermal control regulator operates in a reverse heat flow logic are given below. The use of this reverse acting thermal regular to thermally disconnect from the object being cooled is a great improvement which will greatly reduce the duty cycle of the heat pump and allow for unpowered transport much longer than otherwise possible.

EXAMPLE 2

The lid of example 1 incorporates a thermal control regulator that maintains internal temperatures in the 2 to 8° C. range. The refrigerant in the lid however must be frozen in a fraction of the time required for shipping. Hence, a reverse acting thermal control regulator is used to thermally penetrate the vacuum insulation barrier surrounding the refrigerant. This is accomplished with a thermal actuator using a hydrocarbon phase change material that changes phases, and thereby actuating, at approximately −5° C. The lid is then placed in a standard freezer at −20° C. When the actuator, which is outside the vacuum insulated compartment, reaches −5° C., the actuator will contract thereby closing the previously opened thermal conduit. Once the thermal resistance between the freezer and refrigerant is minimized, the refrigerant's heat can be removed and the refrigerant frozen. Once removed from the freezer and placed on the enclosure, the −5° C. actuator will warm up above −5° C. and extended, thereby opening the thermal conduit greatly increasing the thermal insulation around the refrigerant.

EXAMPLE 3

A thermoelectric powered refrigerator is used to cool down and maintain an internal temperature of between 4 and 9° C. Once temperature is achieved, the power to the refrigerator is stopped until the temperature rises above a certain set point at which time a controller once again supplies power to the thermoelectric device. A reverse acting thermal regulator is located between the thermoelectric cooling module and the internal refrigerator control volume. The thermal actuator of this regulator is based on a phase change hydrocarbon material with a phase change temperature of 5° C. When the system is first powered on, the thermal actuator of the reverse acting thermal control regulator is in the extended position with the thermal conductors separated by an air gap. When the thermoelectric system cools the actuator below 5° C., the actuator contracts and thermal connectivity to the payload control volume is made and the internal temperature is cooled down to the low end of its set point of 4° C. Once the internal temperature is achieved, the controller stops the power to the thermoelectric device and the internal temperature begins to warm. Once the thermal actuator warms to 5° C., the actuator extends and once again opens an air gap to thermally isolate the internal cold volume from the large heat leak through the thermoelectric heat pump. The refrigerator then warms much more slowly without the heat pump heat leak and the heat pump can stay off for long periods of time. Once the system's internal temperature has risen to near 9° C., the controller once again powers the thermoelectric heat pump and the cycle is repeated.

The present invention also pertains to a thermal barrier enclosure system that can be recharged with an onboard refrigeration system. This refrigeration system need not have closed loop control because it does not control the internal temperature of a payload control volume. The active heat pump is only used to recharge the thermal energy storage material of a shipping container, vending machine, or refrigerator. The following example describes a rechargeable thermal enclosure system that can operate for extended periods without power.

EXAMPLE 4

The lid of example 1 incorporates a thermal control regulator that maintains internal temperatures in the 2 to 8°

C. range. The refrigerant, water, in the lid, however must be frozen prior to shipment. A thermoelectric heat pump is integrated into the lid for the purpose of freezing the refrigerant in the lid. A thermal control barrier, using a reverse acting thermal regulator, is positioned between the thermoelectric device and the refrigerant compartment. The external insulation panel of the lid is penetrated with a thermal regulator comprised of a thermal actuator and a series of aluminum conductors, in a concentric cylindrical fashion. The thermal actuator is based on a phase change hydrocarbon material that has a mean phase change temperature of −5° C. When the actuator is at a temperature above about −5° C., the thermal actuator is fully extended. When fully extended the conducting cylindrical components arc spaced apart with an air gap between two aluminum plates, one plate thermally connected to the refrigerant in the lid and the other plate thermally connected to the payload control volume. In this position, there is a high thermal resistance between the refrigerant in the lid and the thermoelectric heat pump. When the thermal actuator drops below about −5° C., the thermal actuator contracts thereby engaging the cylindrical thermal conductor from the aluminum plate coupled to the refrigerant to the heat pump. In this position, the thermal resistance from the refrigerant to the heat pump is very small thereby enabling rapid heat transfer from the refrigerant to the external environment by means of the heat pump, leading to the freezing of the refrigerant. A finned air heat exchanger and a fan that moves air across the fins cool the external, or hot side, of the heat pump. Once the refrigerant is frozen, the heat pump is turned off. As soon as the refrigerant increases in temperature above −5° C., the thermal actuator extends thereby disengaging the thermal conductors and thereby thermally isolating the refrigerant from the heat that would otherwise leak in through the thermally conductive heat pump components.

While the invention has been particularly shown and described with reference to a preferred embodiment, it will be understood by those skilled in the art that various changes in form and detail may be made therein without departing from the spirit and scope of the invention.

What is claimed is:

1. A thermal barrier enclosure system comprising:
    a thermal barrier;
    a thermal actuator; and
    a thermal conduit penetrating the thermal barrier.
2. The thermal barrier enclosure system of claim 1 in which:
    the thermal actuator further comprises a phase change material to open or close the thermal conduit.
3. The thermal barrier enclosure system of claim 1 in which:
    the thermal conduit further comprises slidingly attached thermal conductors to form a variable length thermal path.
4. The thermal barrier enclosure system of claim 1 further comprising an open, thermally insulated box in which:
    an insulated lid is removeably attached to the box;
    a thermal energy storage material is housed in the insulated lid;
    the thermal barrier separates the thermal energy storage material from a payload control volume of the box; and
    the thermal actuator opens and closes the thermal conduit to cause or inhibit the flow of thermal energy between the thermal energy storage material and the payload control volume to maintain a desired temperature range in the payload control volume.
5. The thermal barrier enclosure system of claim 1 further comprising an open, thermally insulated box in which:
    an insulated lid is hingedly attached to the box;
    a thermal energy storage material is housed a lower compartment of the box;
    the thermal barrier separates the thermal energy storage material from a payload control volume of the box; and
    the thermal actuator opens and closes the thermal conduit to cause or inhibit the flow of thermal energy between the thermal energy storage material and the payload control volume to maintain a desired temperature range in the payload control volume.
6. The thermal barrier enclosure system of claim 1 in which:
    the thermal actuator is a reverse-logic thermal actuator.
7. The thermal barrier enclosure system of claim 1 further comprising a thermally insulated box in which:
    a thermal energy storage material acting as a heat sink is housed in a separate compartment of the box;
    the thermal barrier separates the thermal energy storage material from a payload control volume of the box;
    the thermal actuator opens and closes the thermal conduit to cause or inhibit the flow of thermal energy between the thermal energy storage material and the payload control volume to maintain a desired temperature range in the payload control volume; and
    a heating source is located in the payload control volume, the heating source being controllable by a microprocessor.
8. The thermal barrier enclosure system of claim 1 further comprising a thermally insulated box in which:
    a first thermal energy storage material acting as a heat sink is housed in a first separate compartment of the box;
    a second thermal energy storage material acting as a heat source is housed in a second separate compartment of the box;
    the thermal barrier separates one of the thermal energy storage materials from a payload control volume of the box;
    a second thermal barrier separates the other thermal energy storage material from the payload control volume of the box;
    the thermal actuator opens and closes the thermal conduit to cause or inhibit the flow of thermal energy between the first thermal energy storage material and the payload control volume to maintain a desired temperature range in the payload control volume; and
    a second thermal actuator opens and closes a second thermal conduit to cause or inhibit the flow of thermal energy between the second thermal energy storage material and the payload control volume to maintain a desired temperature range in the payload control volume.
9. The thermal barrier enclosure system of claim 1 in which:
    the thermal conduit further comprises an inner concentric member in sliding contact with an outer concentric member.
10. The thermal barrier enclosure system of claim 1 further comprising:
    a thermal interface material on one end of the thermal conduit, the thermal interface material having a thermal resistance that varies with compression height of the thermal interface material.

11. The thermal barrier enclosure system of claim 1 further comprising:
a compliant thermal interface material on the end of the thermal conduit.

12. The thermal barrier enclosure system of claim 1 in which:
the thermal actuator is thermally insulated from the thermal conduit.

13. The thermal barrier enclosure system of claim 1 further comprising:
a reverse-logic thermal actuator.

14. The thermal barrier enclosure system of claim 13 in which:
the thermal actuator further comprises a phase change material to open or close the thermal conduit; and
the reverse-logic thermal actuator further comprises a phase change material to open or close the thermal conduit at a temperature different from the thermal actuator.

15. The thermal barrier enclosure system of claim 13 further comprising an open, thermally insulated box in which:
an insulated lid is removeably attached to the box;
a thermal energy storage material is housed in the insulated lid;
the thermal barrier separates the thermal energy storage material from a payload control volume of the box;
the thermal actuator opens and closes the thermal conduit to cause or inhibit the flow of thermal energy between the thermal energy storage material and the payload control volume to maintain a desired temperature range in the payload control volume; and
the reverse-logic thermal actuator opens and closes the thermal conduit to cause or inhibit the flow of thermal energy to or from the thermal energy storage material to recharge the energy storage material.

16. The thermal barrier enclosure system of claim 13 further comprising an open, thermally insulated box in which:
an insulated lid is removeably attached to the box;
a thermal energy storage material is housed in the box between the thermal barrier and a second thermal barrier;
the thermal barrier divides the box to form a payload control volume;
the thermal actuator opens and closes the thermal conduit to cause or inhibit the flow of thermal energy between the thermal energy storage material and the payload control volume to maintain a desired temperature range in the payload control volume;
the second thermal barrier separates a heat pump from the thermal energy storage material;
the heat pump is attached to the box exterior and in thermal contact with the reverse-logic thermal actuator; and
the reverse-logic thermal actuator opens and closes a second thermal conduit to cause or inhibit the flow of thermal energy to or from the thermal energy storage material to recharge the thermal energy storage material.

17. The thermal barrier enclosure system of claim 13 further comprising an open, thermally insulated box in which:
an insulated lid is hingedly attached to the box;
a thermal energy storage material is housed in a separate compartment of the box;
the thermal barrier separates the thermal energy storage material from a payload control volume of the box;
the thermal actuator opens and closes the thermal conduit to cause or inhibit the flow of thermal energy between the thermal energy storage material and the payload control volume to maintain a desired temperature in the payload control volume; and
the reverse-logic thermal actuator opens and closes the thermal conduit to cause or inhibit the flow of thermal energy to or from the thermal energy storage material to recharge the energy storage material.

18. The thermal barrier enclosure system of claim 3 further comprising an open, thermally insulated box in which:
an insulated lid is hingedly attached to the box;
a thermal energy storage material is housed in the box between the thermal barrier and a second thermal barrier;
the thermal barrier divides the box to form a payload control volume;
the thermal actuator opens and closes the thermal conduit to cause or inhibit the flow of thermal energy between the thermal energy storage material and the payload control volume to maintain a desired temperature range in the payload control volume;
the second thermal barrier separates a heat pump from the thermal energy storage material;
the heat pump is attached to the box exterior and in thermal contact with the reverse-logic thermal actuator; and
the reverse-logic thermal actuator opens and closes a second thermal conduit to cause or inhibit the flow of thermal energy to or from the thermal energy storage material to recharge the thermal energy storage material.

19. A thermal barrier enclosure system comprising:
a thermal energy storage material;
an insulating thermal barrier;
a thermal conduit to allow heat transfer through the thermal barrier; and
a thermal actuator to open and close the thermal conduit.

20. A method for regulating heat flow comprising the steps of:
partitioning a space with a thermal barrier;
opening or closing a thermal path with a thermal actuator; and
collecting or discharging the heat in a thermal energy storage material.

* * * * *